(12) United States Patent
Pursifull et al.

(10) Patent No.: US 9,874,137 B2
(45) Date of Patent: Jan. 23, 2018

(54) SYSTEM AND METHOD FOR CANISTER PURGING

(71) Applicant: Ford Global Technologies, LLC, Dearborn, MI (US)

(72) Inventors: Ross Dykstra Pursifull, Dearborn, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 14/742,535

(22) Filed: Jun. 17, 2015

(65) Prior Publication Data

US 2016/0369713 A1    Dec. 22, 2016

(51) Int. Cl.

| F02M 33/02 | (2006.01) |
| F02B 33/44 | (2006.01) |
| F02M 25/08 | (2006.01) |
| F02M 35/104 | (2006.01) |
| F02D 41/00 | (2006.01) |
| F02M 35/10 | (2006.01) |

(52) U.S. Cl.
CPC .......... *F02B 33/44* (2013.01); *F02D 41/0007* (2013.01); *F02D 41/0032* (2013.01); *F02M 25/0836* (2013.01); *F02M 25/0854* (2013.01); *F02M 25/0872* (2013.01); *F02M 35/104* (2013.01); *F02D 2200/0406* (2013.01); *F02M 35/1038* (2013.01); *F02M 35/10222* (2013.01); *Y02T 10/144* (2013.01)

(58) Field of Classification Search
CPC .. F02B 33/44; F02D 41/0007; F02D 41/0032; F02M 25/0836; F02M 25/0854; F02M 25/0872; F02M 25/089; F02M 35/104; Y02T 10/144

USPC .......................................................... 701/103
See application file for complete search history.

(56) References Cited

U.S. PATENT DOCUMENTS

| 5,005,550 A * | 4/1991 | Bugin, Jr. ............. F02M 25/089 |
| | | 123/520 |
| 6,695,895 B2 | 2/2004 | Hyodo et al. |
| 7,311,089 B2 | 12/2007 | Balsdon |
| 8,483,934 B2 | 7/2013 | Cunningham et al. |

(Continued)

FOREIGN PATENT DOCUMENTS

| DE | 102011084539 B3 | 12/2012 |
| EP | 0701056 B1 | 3/2001 |

OTHER PUBLICATIONS

Ulrey J. et al., "System and Method for Improving Canister Purging," U.S. Appl. No. 14/593,945, filed Jan. 9, 2015, 82 pages.

(Continued)

*Primary Examiner* — Hai Huynh
*Assistant Examiner* — Gonzalo Laguarda
(74) *Attorney, Agent, or Firm* — James Dottavio; McCoy Russell LLP

(57) ABSTRACT

Methods and systems are provided for enhancing purge flow when applying shallow intake manifold vacuum. An alternate purge route that circumvents the more restrictive canister purge valve and directs purge vapors through a branched path via a less restrictive mechanical purge valve is used during low intake manifold vacuum conditions. By enabling higher purge flow rates when manifold vacuum is lower, a more complete canister cleaning is ensured.

9 Claims, 8 Drawing Sheets

(56) References Cited

U.S. PATENT DOCUMENTS

| | | | |
|---|---|---|---|
| 2011/0132331 A1* | 6/2011 | Pursifull | F02B 37/127 |
| | | | 123/478 |
| 2011/0307157 A1* | 12/2011 | Pursifull | F02D 41/0007 |
| | | | 701/102 |
| 2012/0247432 A1 | 10/2012 | Cardno | |
| 2014/0096750 A1* | 4/2014 | Pearce | F02M 25/0818 |
| | | | 123/520 |
| 2014/0116399 A1* | 5/2014 | Ulrey | F02M 25/08 |
| | | | 123/520 |
| 2014/0224225 A1 | 8/2014 | Kragh | |
| 2016/0201613 A1* | 7/2016 | Ulrey | F02D 41/0007 |
| | | | 123/520 |

OTHER PUBLICATIONS

Pursifull R. et al., "System and Method for Improving Canister Purging," U.S. Appl. No. 14/593,985, filed Jan. 9, 2015, 82 pages.
Pursifull R. et al., "System and Method for Improving Canister Purging," U.S. Appl. No. 14/691,375, filed Apr. 20, 2015, 73 pages.

* cited by examiner

SYSTEM AND METHOD FOR CANISTER PURGING

FIELD

The present disclosure relates to systems and methods for improving purging of fuel vapors from a fuel vapor canister into an internal combustion engine.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system may allow the vapors to be purged into an engine intake manifold for use as fuel.

The purging of fuel vapors from the fuel vapor canister may involve opening a canister purge valve coupled to a conduit between the fuel vapor canister and the intake manifold. During a purge operation, vacuum or negative pressure in the intake manifold may draw air through the fuel vapor canister enabling desorption of fuel vapors from the canister. These desorbed fuel vapors may flow through the canister purge valve into the intake manifold. As such, the canister purge valve may regulate the flow of fuel vapors (mixed with air) into the intake manifold via a sonic choke positioned between a valve in the canister purge valve and the intake manifold. Accordingly, the sonic choke may function as a flow restrictor in the purge path between the valve and the intake manifold. The sonic choke aids flow rate predictability when the intake manifold vacuum is deeper than 15 kPa. However, it also serves to limit the maximum possible flow rate. This restriction is particularly adverse at shallow intake manifold vacuums and during boost when the vacuum is sourced by an ejector (or aspirator).

In boosted engines, during boost conditions when the compressor is operative, the intake manifold may have a positive pressure. Herein, an aspirator coupled in a compressor bypass passage may generate vacuum that can be used to draw stored fuel vapors from the fuel vapor canister. However, purge flow rate through the aspirator may be lower because the sonic choke in the canister purge valve may excessively restrict canister purge flow to the suction port of the aspirator. Accordingly, purging of the fuel vapor canister via vacuum drawn from the aspirator may be severely diminished by the presence of the sonic choke in the flow path.

An example approach demonstrating an improved purging operation is shown by Stephani in DE 102011084539. Herein, an aspirator coupled in the compressor bypass passage directly communicates with the fuel vapor canister such that fuel vapors are purged to the aspirator from the fuel vapor canister without flowing through a canister purge valve. By directly coupling the fuel vapor canister to the aspirator, the metering effect of the sonic choke in the canister purge valve may be circumvented. A diverter valve in the compressor bypass passage regulates flow through the aspirator and therefore, purging of the fuel vapor canister.

The inventors herein have identified potential issues with the above approach. As an example, while the approach of Stephani may improve the purge flow rate at higher levels of boost, during conditions when the boost level is lower, such as at engine idling or vehicle cruising conditions, purge flow through the aspirator may be limited. During the same conditions, purge flow through the canister purge valve may also be limited due to the shallow level of intake manifold vacuum. Due to the reduced purge flow, the canister may not be sufficiently purged, degrading exhaust emissions, and rendering the engine emissions non-compliant.

The inventors herein have recognized that enhancing purge flow rate in the shallow intake manifold vacuum region is significant because the engine is often in this condition. Specifically, pumping losses are lower in the shallow intake manifold vacuum region of engine operation, making it a high engine efficiency region. Consequently, engine control systems may operate the engine in the shallow intake manifold vacuum region for a significant portion of a drive cycle. If the purging ability in the shallow manifold vacuum region is limited, a significant purging opportunity is lost. In addition, and serendipitously, high purge flow tolerance in the shallow manifold region is greater. This is due to engine airflow being relatively high in this region. As a result, if the canister is purged during shallow manifold vacuum conditions, the engine's fuel control system may be able to better tolerate the additional fuel and air in the purge flow. Consequently, to improve a canister purge flow rate during shallow manifold vacuum conditions, the inventors have developed a method for a boosted engine comprising: during a first condition, purging a canister via a purge valve; during a second condition, purging the canister via an ejector coupled in a compressor bypass; and during a third condition, purging the canister via a low restriction valve while bypassing each of the purge valve and the aspirator. In this way, canister purging is improved.

This approach adds flow rate enhancement without degrading the existing fine control at low air flow rates provided by the canister purge valve which includes a sonic choke. It provides a three-path purge solution (for deep intake manifold vacuum, shallow intake manifold vacuum, and vacuum via ejector at boost). The purge system enables air flow through the canister to be maximized during the defined drive cycle allotted to purge the canister. Maximizing the total air flow through the canister allows for the canister to be maximally emptied. For example, it may be possible to empty the canister to 80% empty over the drive cycle with an engine operating with reduced intake manifold vacuum. While the instantaneous purge flow rate may be limited during other purging conditions by other considerations such as the fraction of the engine's requisite fuel sourced via vapor purge, this may seldom be a limiting factor at boost or shallow intake manifold vacuum (a.k.a. manvac) conditions.

As an example, during conditions when there is sufficient intake manifold vacuum, a fuel vapor canister may be directly purged to an engine intake by opening a canister purge valve (CPV) and applying the intake manifold vacuum on the canister. During boosted engine operation, compressed air may be circulated through an ejector to the compressor inlet to generate vacuum at the ejector's neck. The generated vacuum is then applied on the canister by opening a bypass valve, allowing the canister to be purged to the compressor's inlet, while circumventing the more restrictive CPV. During conditions when the intake manifold vacuum is shallow, an alternate purge route may be used. Specifically, a special, low restriction purge valve may be coupled to the engine system in a branched purge line coupling the canister to the intake manifold. The special, low restriction purge valve may be a mechanical valve having a ball coupled to a spring-loaded valve, and optionally further including a sonic choke upstream of the ball to limit the maximum purge flow rate through the valve. As such, the sonic choke may not be needed if there is enough naturally-occurring restriction. However, if the valve was exceptionally free-flowing, the sonic choke would establish some restriction to improve controllability. However, this sonic choke is far less restrictive than the sonic choke contained in the classic CPV which serves the system during deep intake manifold vacuum. The low restriction valve may be configured to automatically (e.g., without electrical input) open at shallow manifold vacuum levels and automatically close at higher manifold vacuum levels. During engine operation in the shallow manifold vacuum region, when the low restriction purge valve is open, the bypass valve may also be commanded open so that fuel vapors can be flowed from the canister through the bypass valve and the low restriction purge valve into the intake manifold, while circumventing the classic, highly restricted canister purge valve. In some examples, based on engine boost levels when purging conditions are met (such as responsive to a tip-in or tip-out event), and corresponding intake manifold vacuum levels, a purge route may be selected and one or more of intake manifold vacuum or aspirator vacuum may be applied to a canister to enable a more complete cleaning.

In this way, the amount of fuel vapors that may be purged from a fuel vapor canister over an engine drive cycle may be increased, even as engine boost levels and intake manifold vacuum levels vary. The technical effect of coupling a less restrictive mechanical valve between a canister and an intake manifold is that shallow manifold vacuum levels can be advantageously used to more completely purge the canister, without necessitating flow through the more restrictive canister purge valve. By coupling the mechanical valve to the canister upstream of the canister purge valve (that also couples the canister to the intake manifold), a less restricted purge flow is enabled even when there is a small pressure difference across the mechanical valve. In addition, the higher engine airflow during the shallow manifold vacuum enables the higher purge flow rate to be better tolerated by the engine, without experiencing significant air-fuel excursions. The combination of the higher purge flow rate (and higher purge flow rate tolerance) during the shallow manifold vacuum conditions, and the frequent engine operation in the shallow manifold vacuum region allows the canister to be more thoroughly purged over a vehicle drive cycle. As such, this improves engine performance, fuel economy, and emissions compliance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
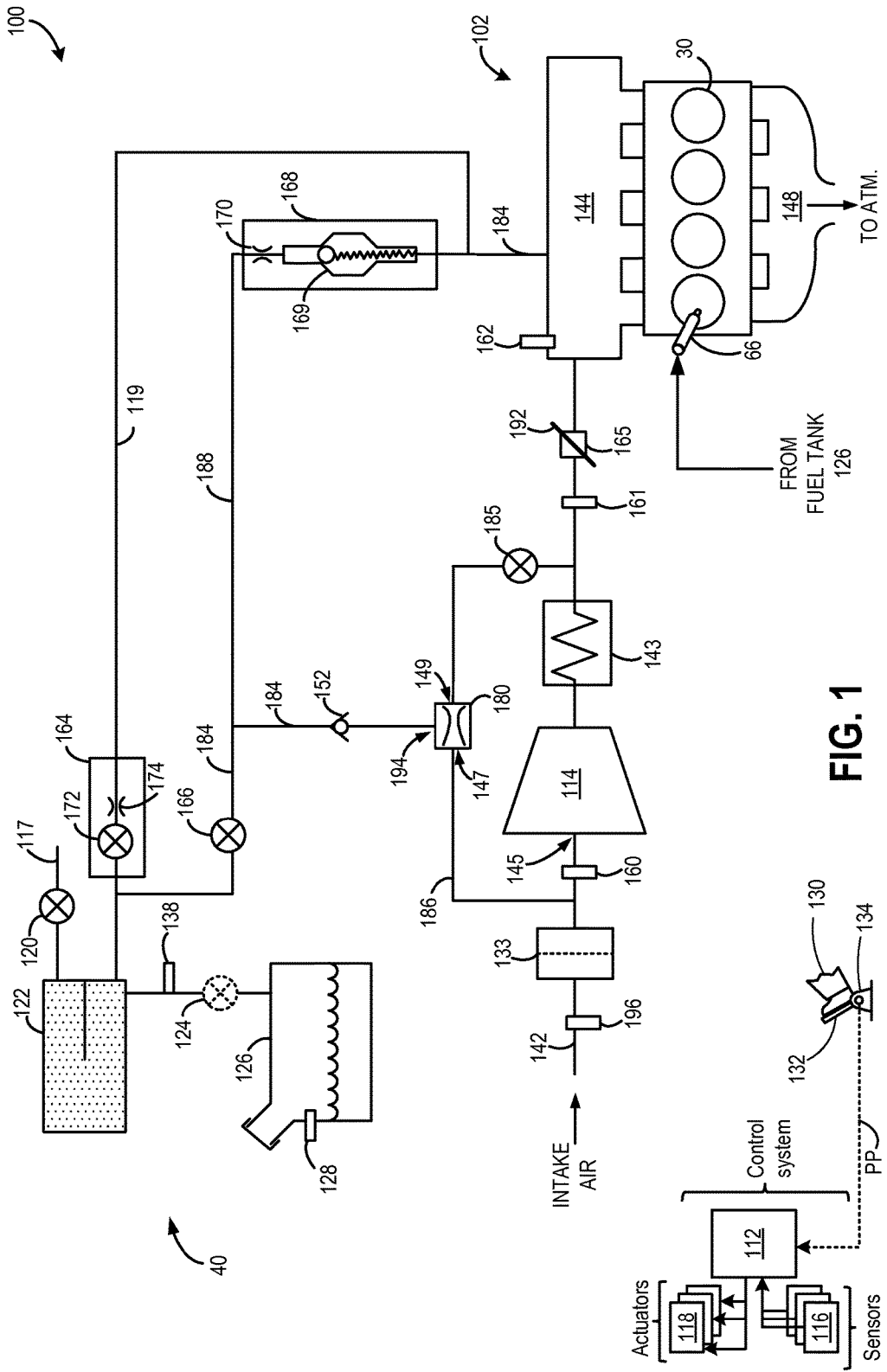
FIG. 1 is a schematic depiction of an example engine system including a canister purge valve, a low restrictive bypass purge valve, and a high restrictive bypass purge valve.
Figure 2:
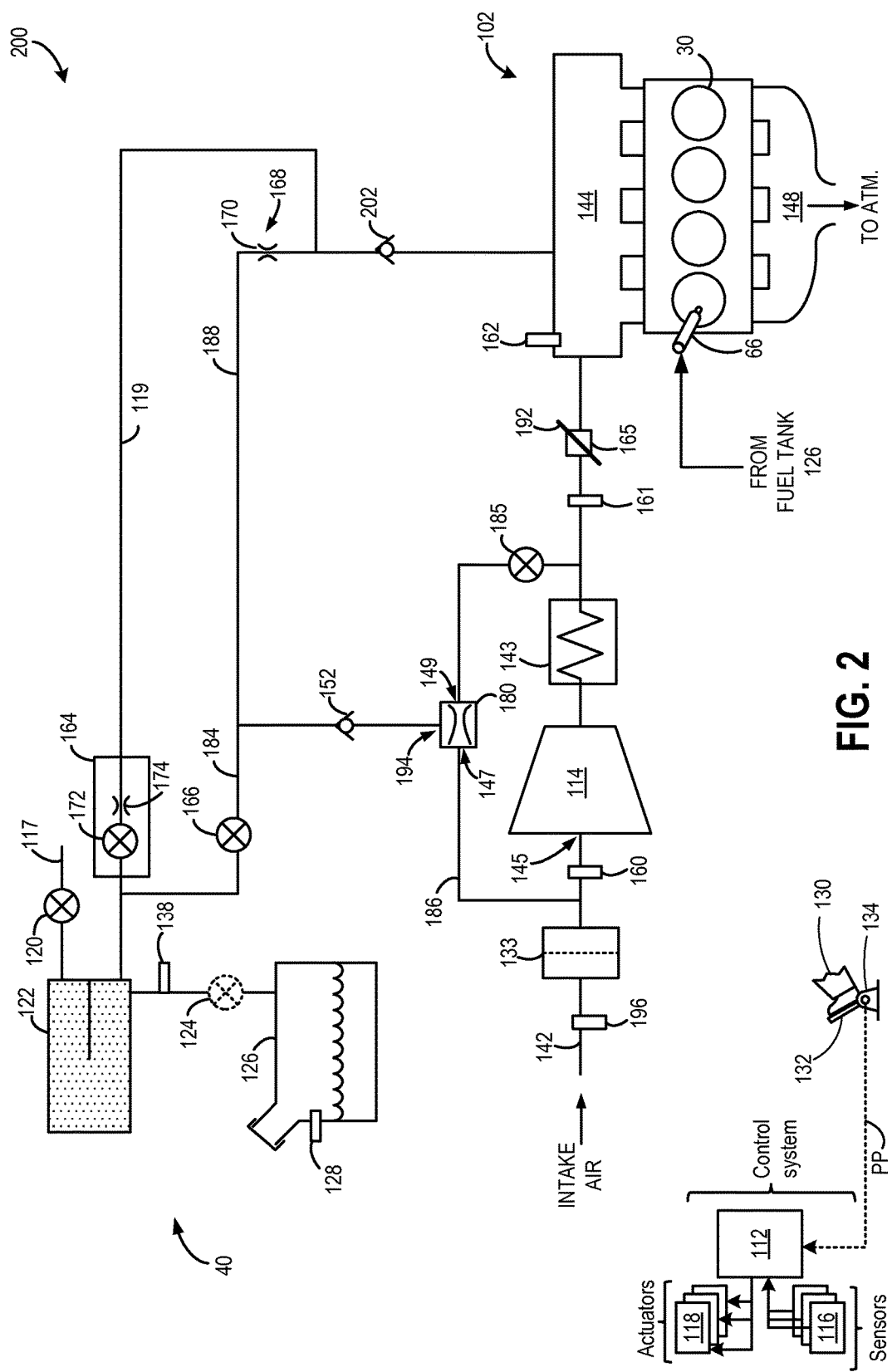
FIGS. 2-3 depict alternate embodiments of the engine system of FIG. 1 with the plurality of purge valves.
Figure 3:
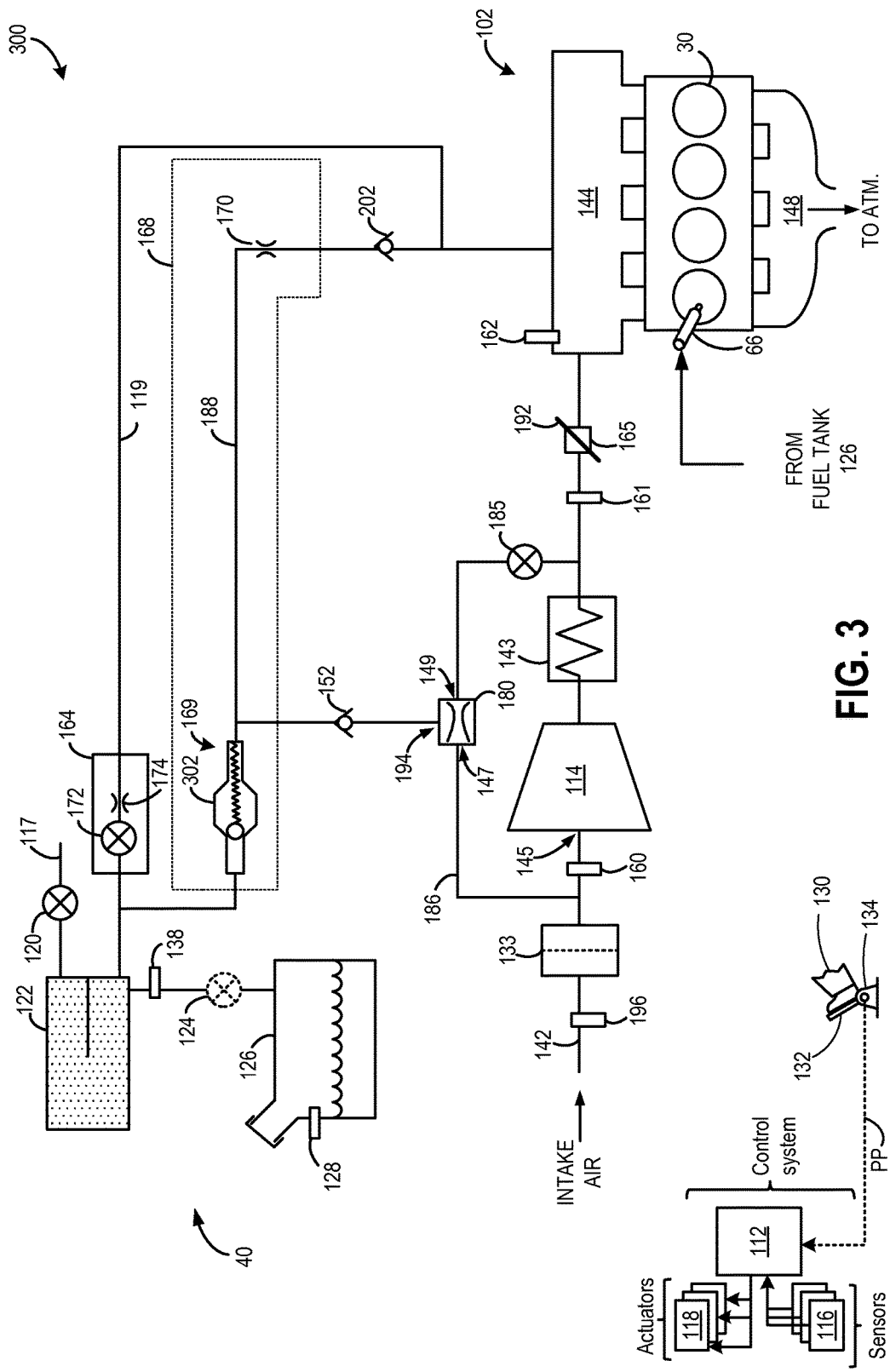
Figure 5:
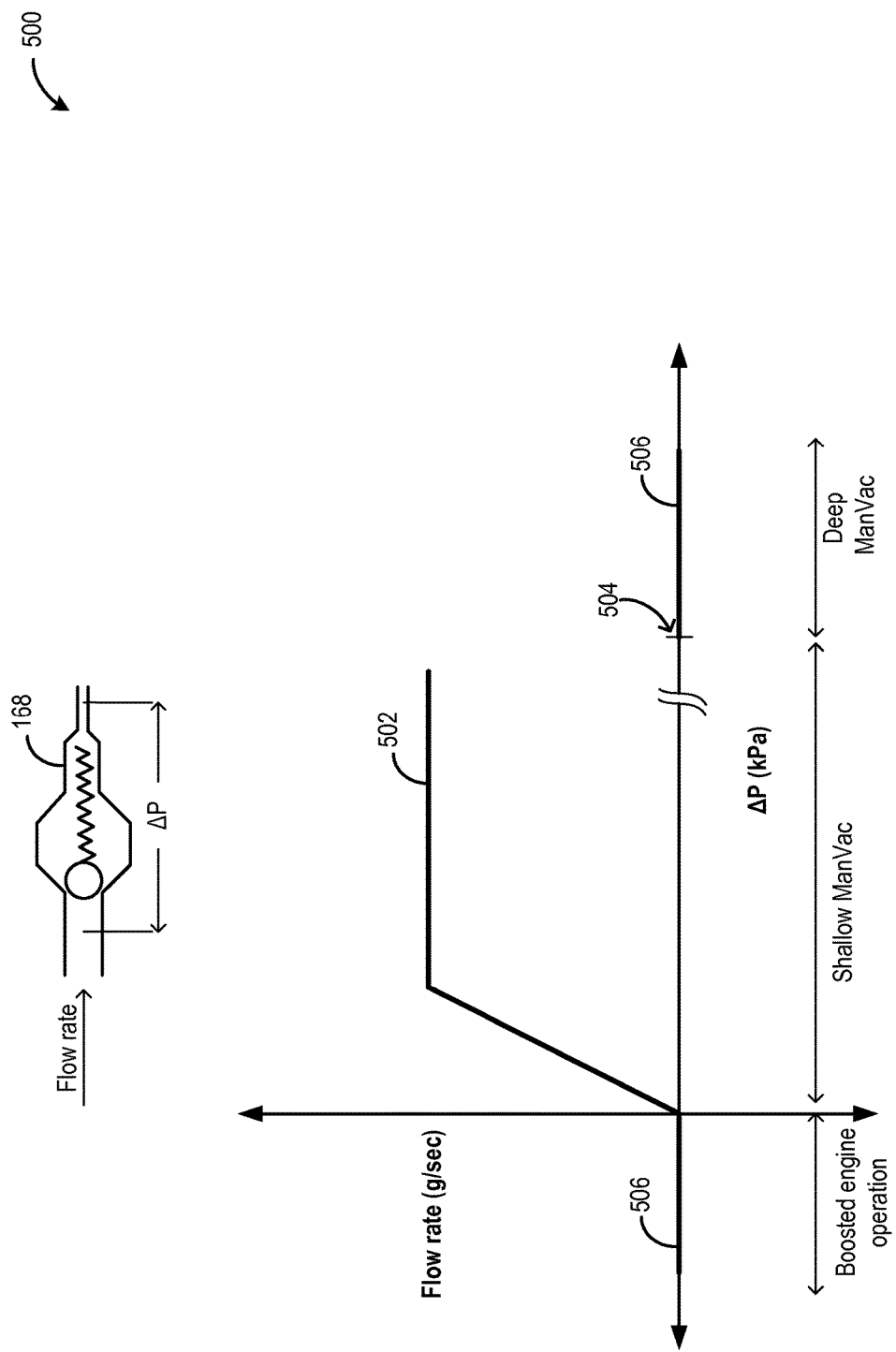
FIG. 5 depicts an example map of purge flow rates through the high restrictive bypass purge valve of FIGS. 1-3 at different intake manifold vacuum conditions.
Figure 6:
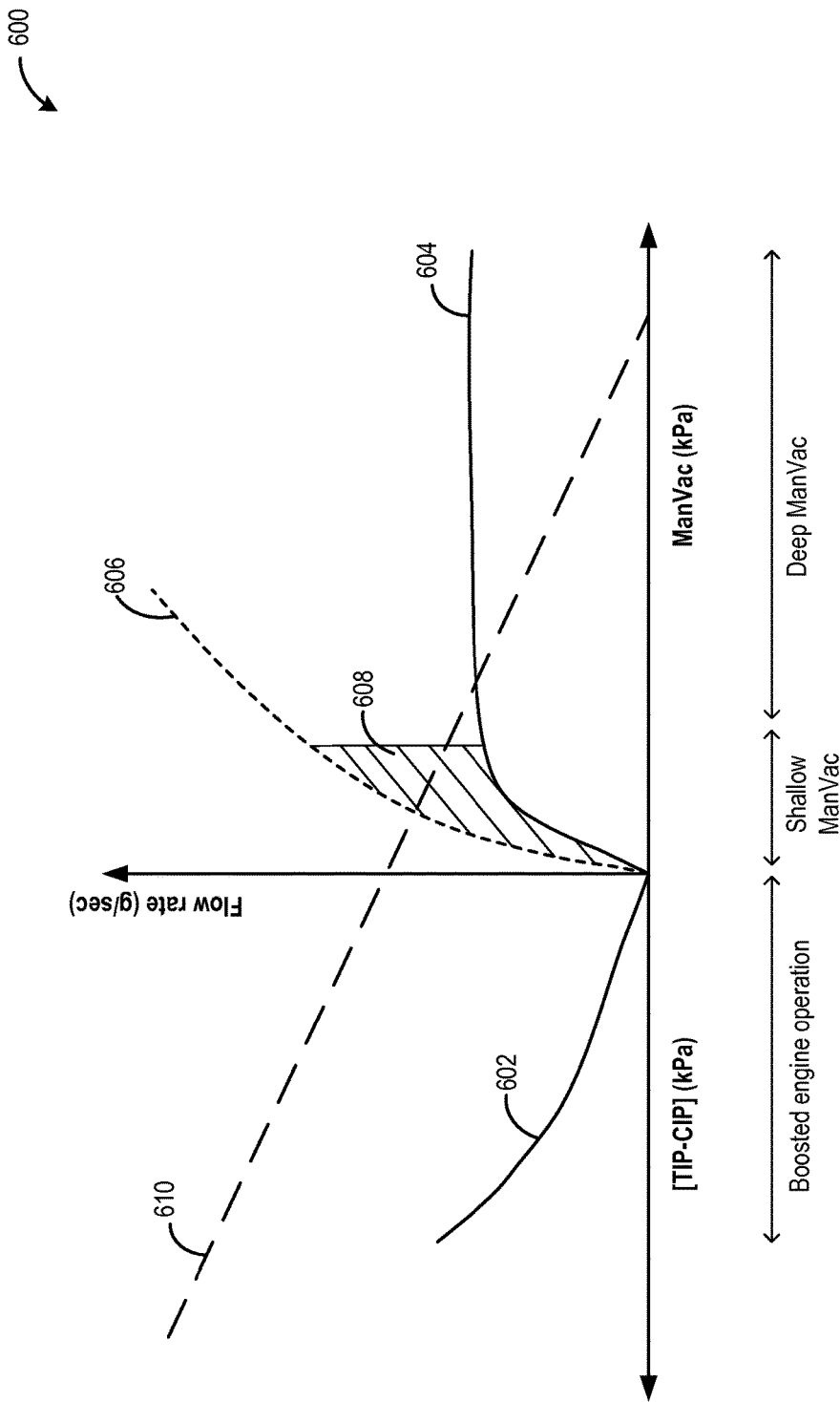
FIG. 6 presents an example map of purge flow regions of the engine system of FIGS. 1-3 at different intake manifold vacuum conditions.

The following detailed description relates to systems and methods for improving purging of a fuel vapor canister included in a boosted engine system, such as the engine system of FIGS. 1-3. The engine system includes a pressure-actuated mechanical valve that enhances purge flow from a canister to the engine intake manifold during shallow manifold vacuum conditions (FIGS. 5-6). A controller may be configured to perform a control routine, such as the example routine of FIGS. 4A-4B, to adjust a purging route for canister fuel vapors based on manifold pressure. Example purging operations during boosted and naturally-aspirated engine operating conditions, and with varying levels of boost, are shown with reference to FIG. 7. In this way, canister purging may be enabled over a wider range of engine operating conditions.

Referring now to FIG. 1, it shows aspects of an example engine system 100 which may be included in an automotive vehicle. The engine system is configured for combusting fuel vapor accumulated in at least one component thereof. Engine system 100 includes a multi-cylinder internal combustion engine, generally depicted at 102, which may propel the automotive vehicle. Engine 102 may be controlled at least partially by a control system including a controller 112 and by input from a vehicle operator 130 via an input device 132. In this example, input device 132 includes an accelerator pedal and a pedal position sensor 134 for generating a proportional pedal position signal PP.

Engine 102 includes an intake throttle 165 fluidly coupled to an intake manifold 144 along an intake passage 142. Air may enter intake passage 142 from an air intake system (AIS) including an air cleaner 133 in communication with the vehicle's environment. A barometric pressure sensor 196 may be coupled at an inlet of intake passage 142 for providing a signal regarding barometric pressure (BP). Intake throttle 165 may include throttle plate 192. In this particular example, the position of throttle plate 192 may be varied by controller 112 via a signal provided to an electric motor or actuator included with intake throttle 165, a configuration that is commonly referred to as electronic throttle control (ETC). In this manner, intake throttle 165 may be operated to vary the intake air provided to intake manifold 144 and the plurality of cylinders therein.

Intake manifold 144 is configured to supply intake air or an air-fuel mixture to a plurality of combustion chambers 30 (also termed, cylinders 30) of engine 102. A manifold air pressure sensor 162 may be coupled to intake manifold 144 for providing a signal regarding manifold air pressure (MAP) to controller 112. An estimate of the manifold airflow (MAF) may be obtained from a MAF sensor (not shown) coupled to intake manifold 144, and communicated with controller 112. Alternatively, MAF may be inferred from alternate engine operating conditions, such as manifold air pressure (MAP), as measured by MAP sensor 162. The combustion chambers 30 may be arranged above a lubricant-filled crankcase (not shown), in which reciprocating pistons of the combustion chambers rotate a crankshaft (not shown). Combustion chambers 30 may be supplied one or more fuels via fuel injectors 66. Fuels combusted in the cylinders may include gasoline, alcohol fuel blends, diesel, biodiesel, compressed natural gas, etc. Fuel may be supplied to the combustion chambers via direct injection (as shown in FIG. 1), port injection, throttle valve-body injection, or any combination thereof. It will be noted that a single fuel injector 66 is depicted in FIG. 1 and though not shown, each combustion chamber 30 may be coupled with a respective fuel injector 66. In the combustion chambers, combustion may be initiated via spark ignition and/or compression ignition. Further, exhaust gases from combustion chambers 30 be released into an exhaust manifold 148, wherefrom they may be expelled to the atmosphere upon passage through an emission control device (not shown) coupled to an exhaust passage or tailpipe (not shown).

Engine system 100 may further include a boosting device having a compressor 114 for providing a boosted intake air charge to intake manifold 144. In one example, the boosting device is a turbocharger wherein compressor 114 is mechanically coupled to and driven by an exhaust turbine (not shown) powered by exhaust gases flowing from the engine. A wastegate (not shown) may be coupled in a bypass passage between an inlet and outlet of the exhaust turbine. By adjusting a position of the wastegate, an amount of exhaust gas can be delivered to the exhaust passage from the exhaust manifold, while bypassing the turbine, thereby controlling (e.g., reducing) the output of the exhaust turbine. Alternatively, compressor 114 may be any suitable intake-air compressor, such as a motor-driven or engine crankshaft-driven supercharger compressor.

Compressor 114 draws fresh air from air cleaner 133 and flows compressed air through intercooler 143 (also referred to as a charge air cooler). Each of compressor 114 and intercooler 143 are positioned upstream of intake throttle 165. The intercooler 143 cools the compressed air, which then flows via intake throttle 165 to intake manifold 144. A compressor inlet pressure sensor 160 is coupled immediately upstream of the compressor 114 for providing a signal regarding compressor inlet pressure (CIP) to controller 112. A throttle inlet pressure sensor 161 may be coupled immediately upstream of intake throttle 165 for providing a signal regarding throttle inlet pressure (TIP) or boost pressure.

An ejector passage 186 may be coupled across compressor 114 to recirculate a smaller portion (e.g., less than 3 g/s) of compressed intake air from downstream of intercooler 143 to upstream of compressor 114, specifically into compressor inlet 145, via an ejector 180. In alternate embodiments, the ejector passage may couple the compressor outlet upstream of the intercooler to the compressor inlet. As such, the ejector passage 186 (herein also referred to as a compressor bypass) may be distinct from, and arranged parallel to, a compressor bypass passage (not shown) also coupled across compressor 114 to recirculate a larger portion (e.g., 10-100 g/s) of compressed intake air from the compressor outlet to the compressor inlet 145 via a compressor recirculation valve (not shown). Flow through the compressor bypass passage may be used for compressor surge control and boost pressure control while flow through the ejector passage (or compressor bypass) is used for ejector vacuum generation.

Ejector passage 186 may include an ejector 180, positioned as shown in FIG. 1. Ejector (which may alternatively be referred to as aspirators, venturi pumps, jet pumps, and eductors) are passive devices which provide low-cost vacuum generation when utilized in engine systems. Specifically, a motive inlet 149 of ejector 180 may be coupled to the inlet of ejector passage 186 (proximate to the intercooler outlet) while a motive outlet 147 of ejector 180 may be coupled to the outlet of ejector passage 186 (proximate to compressor inlet 145). Flow of compressed air through ejector passage 186 and through ejector 180 may generate a vacuum at the throat or suction port 194 of ejector 180. The vacuum drawn at the ejector via compressor bypass flow may then be applied on one or more engine components, such as on a fuel vapor canister for purging purposes, as described herein. In alternate examples, the drawn vacuum may be applied on an engine crankcase for crankcase purging, or used for actuation of various vacuum actuators (e.g., brake booster). In still further examples, the vacuum may be stored in a vacuum reservoir for later use. In either case, compressed air flowing through the ejector may be mixed with other fluids (e.g., air or fuel vapors) that are drawn into the ejector via suction port 194, the mixture then streamed into compressor inlet 145, for subsequent ingestion in engine cylinders.

An amount of compressed air diverted through ejector passage 186 may be adjusted via an optional shut-off valve (SOV) 185 coupled upstream of the ejector, and more specifically, upstream of the motive inlet of the ejector. That is, no other components may be coupled between the ejector and SOV 185. By controlling SOV 185, and varying an amount of air diverted through ejector passage 186, a boost pressure provided to the engine can be regulated (for example, to enable surge control). In addition, an amount of vacuum generated at ejector 180 may also be controlled. SOV 185 may be a solenoid actuated binary on/off valve capable of assuming a fully-open or a fully-closed position upon electric actuation of an associated solenoid. Alternatively, SOV 185 may be a continuously variable valve capable of assuming positions a fully-closed position, a fully-open position, and any position there-between. In one example, as elaborated with reference to FIGS. 4A-4B, an opening of SOV 185 may be adjusted based on canister load and manifold pressure conditions to generate sufficient ejector vacuum for purging a fuel vapor canister. It will be appreciated that in alternate examples, SOV 185 may be a pneumatic (e.g., vacuum-actuated) valve, the actuating vacuum sourced from the intake manifold and/or a vacuum reservoir and/or other low pressure sinks of the engine system. Further still, SOV 185 may be a passive valve. In still other examples, SOV 185 may not be included in the ejector passage and flow through the ejector passage may be driven based on relative pressure levels within the engine system. For example, as the boost pressure increases, flow through ejector passage 186 may increase.

Engine system 100 further includes fuel system 40 comprising fuel tank 126, fuel vapor canister 122, and other components which will be described further below. Fuel tank 126 stores a volatile liquid fuel that may be delivered via fuel injector 66 to combustion chambers 30 in engine 102. To reduce emission of fuel vapors from the fuel tank 126 into the atmosphere, the fuel tank 126 is vented to the atmosphere through fuel vapor canister 122. Specifically, air and fuel vapors may be vented along vent 117, including vent valve 120, upon passage through canister 122 where fuel vapors are adsorbed. Fuel vapor canister may also be referred to as an adsorbent canister, a fuel system canister, a charcoal canister, or simply, a canister, in the rest of this description. Fuel vapor canister 122 may have a significant capacity for storing hydrocarbon-, alcohol-, and/or ester-based fuels in an adsorbed state. The adsorbent canister may be filled with activated carbon granules and/or another high surface-area material to adsorb fuel vapors received from the fuel tank. Nevertheless, prolonged adsorption of fuel vapors can eventually reduce the capacity of the adsorbent canister for further storage and may result in bleed emissions. Therefore, the adsorbent canister may be periodically purged of adsorbed fuel vapors, as further described hereinafter. While a single fuel vapor canister 122 is shown in FIG. 1, it will be appreciated that any number of canisters may be coupled in engine system 100.

A vapor blocking valve (VBV) 124 (also referred to as a fuel tank isolation valve) may be optionally included in a conduit between fuel tank 126 and fuel vapor canister 122. In some embodiments, VBV 124 may be a solenoid valve, and operation of VBV 124 may be regulated by adjusting a driving signal (or pulse width) of the dedicated solenoid. The VBV may be a normally open valve. During engine running, VBV 124 may be closed to limit the amount of diurnal vapors directed to canister 122 from fuel tank 126. This focuses the purge system on reducing the fuel in the canister without the tank slosh causing intermittent high fuel vapor concentrations ingested by the engine. During refueling operations, and selected purging conditions, VBV 124 may be temporarily opened to direct fuel vapors from the fuel tank 126 to canister 122. By opening VBV 124 during conditions when the fuel tank pressure is higher than a threshold pressure (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the FTIV may be mounted on fuel tank 126.

One or more pressure sensors 138 may be coupled to fuel tank 126 for estimating a fuel tank pressure or vacuum level. While the depicted example shows a pressure sensor coupled between the fuel tank and VBV 124, in alternate embodiments, pressure sensor 138 may be coupled to fuel tank 126.

Fuel vapors released from canister 122 during a purging operation may be directed into intake manifold 144 via canister purge conduit 119. As such, canister purge conduit 119 may be a first purge line that is used for purging the canister during engine operation with natural aspiration (that is, without boost). Specifically, during non-boosted purging conditions, the deeper intake manifold vacuum may be applied on canister 122 (through CPV 164) to draw canister fuel vapors into intake manifold 144. The flow of vapors along canister purge conduit 119 may be regulated by canister purge valve (CPV) 164. The quantity and rate of vapors released by the canister purge valve may be adjusted by controlling the duty cycle of an associated canister purge valve solenoid (not depicted), via controller 112, responsive to engine operating conditions including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in canister purge conduit 119 to prevent intake manifold pressure from flowing gases in the opposite direction of the purge flow. When included, the check may be positioned downstream (in the direction of purge flow) of the canister purge valve. As such, the optional canister check valve may be included if the canister purge valve control is not accurately timed or the canister purge valve itself can be forced open by a high intake manifold pressure.

CPV 164 may comprise a solenoid valve 172 and a flow restriction. In the depicted example, the flow restriction may be a sonic choke 174. A sonic choke is a special kind of flow restriction that results in a substantially fixed flow rate for deeper vacuum levels, such as a vacuum deeper than 15-20 kPa. The sonic choke has an ability of pressure recovery that makes it different from an orifice (which does not have the ability of pressure recovery). Without pressure recovery, choked flow may occur at deeper vacuums, such as a vacuum deeper that 48 kPa, assuming an upstream pressure is 100 kPa. Sonic choke 174 may be sized to render CPV 164 more restrictive, and limit a maximum purge flow through CPV 164. As such CPV 164 may be a more restrictive valve to enable repeatable purge flow rates at high manifold vacuum conditions.

Opening or closing of CPV 164 is performed via actuation of solenoid valve 172 by controller 112. Specifically, a pulse width modulated (PWM) signal may be communicated to the solenoid valve 172 during a canister purging operation. The PWM signal may be at a frequency of 10 Hz, 20 Hz, or engine-synchronous as an example.

It will be noted that the solenoid valve 172 and the sonic choke 174 may be positioned within a single, common housing of CPV 164. It will be appreciated that the CPV may include valves other than solenoid valves and flow restrictions other than sonic chokes without departing from the scope of the present disclosure. Sonic choke 174 may also be referred to herein as a sonic nozzle. Sonic choke 174 is positioned downstream of solenoid valve 172 such that an inlet of sonic choke 174 fluidically communicates with an outlet of solenoid valve 172. An outlet of sonic choke 174 may be fluidically coupled to intake manifold 144, downstream of intake throttle 165, via a check valve (such as check valve 212, as shown in the configuration of FIG. 2).

Fuel vapors released from canister 122 during a purging operation may alternatively be directed to compressor inlet 145 via bypass purge conduit 184 and ejector 180, while circumventing CPV 164. As such, bypass purge conduit 184 may be a second purge conduit that is primarily used for purging the canister during engine operation with higher levels of boost. Specifically, during selected boosted purging conditions, compressed air may be circulated through ejector passage 186, via ejector 180, to generate a vacuum at the throat of the ejector. The drawn vacuum is then applied on the canister so that fuel vapors may be flowed from the canister into the suction port 194 of the ejector via bypass purge conduit 184. The drawn fuel vapors are mixed with compressor bypass flow at the ejector motive outlet 147 and directed into the compressor inlet 145 wherefrom they are delivered to the intake manifold for ingestion in engine cylinders. A check valve 152 may be included in bypass purge conduit 184 to ensure a single direction of flow from the canister to the ejector suction port, and disable reverse flow of high pressure air towards the canister.

The flow of fuel vapors along bypass purge conduit 184 may be regulated by canister purge bypass valve (CPBV) 166. CPBV 166 may be a binary solenoid on/off valve capable of assuming a fully-open or a fully-closed position upon electric actuation of an associated solenoid. Alternatively, CPBV 166 may be a continuously variable valve capable of assuming a fully-closed position, a fully-open position, and any position there-between. In one example, as elaborated with reference to FIGS. 4A-4B, an opening of CPBV 166 may be adjusted based on canister load and manifold pressure, as well as boost pressure conditions to provide a desired purge flow rate. It will be appreciated that in alternate examples, CPBV 166 may be a pneumatic (e.g., vacuum-actuated) valve, the actuating vacuum sourced from the intake manifold and/or a vacuum reservoir and/or other low pressure sinks of the engine system. By circumventing the restrictive canister purge valve, purge flow through bypass purge conduit 184 can be provided at a higher purge flow rate than may be possible along canister purge conduit 119 for a given pressure difference.

The inventors herein have recognized that when intake manifold vacuum is deep (e.g., greater than 15 kPa), there is sufficient fuel vapor purge flow from the canister to the intake manifold (via CPV 164 and along purge conduit 119). Likewise, during boosted operation, when the intake manifold vacuum is low, compressor bypass flow can be advantageously harnessed to generate ejector vacuum, which in turn enables sufficient fuel vapor purge flow from the canister to the compressor inlet (via CPBV 166 and along bypass purge conduit 184). However, at shallow manifold vacuum levels, such as when manifold vacuum is in the range of 0-10 kPa, there is insufficient purge flow. For example, purge flow can fall below 0.5 g/s. Enhancing purge flow during shallow manifold vacuum levels can provide a significant improvement in canister purging efficiency since engines are designed to operate in the shallow intake manifold vacuum region for a long portion of the engine drive cycle (due to the region having lower pumping losses and higher fuel economy). In view of this requirement, a third less restrictive purge route is included in the engine system including an ultra-low restriction purge valve (LRPV 168) that allows for higher purge flows during shallow intake manifold conditions. For example, use of LRPV 168 may enable purge flows to be increased to 1-3 g/s during shallow intake manifold conditions of 2-8 kPa.

Accordingly, fuel vapors released from canister 122 during a purging operation may be directed to intake manifold 144 via a branched bypass purge conduit 188, while circumventing CPV 164 and ejector 180. As such, branched bypass purge conduit 188 may be a third purge conduit that is primarily used for purging the canister during engine operation with a shallow manifold vacuum level, such as at low-to-mid boost levels. Branched bypass purge conduit 188 may be coupled between intake manifold 144 and bypass purge conduit 184, at a location downstream of CPBV 166 and upstream of ejector 180 and check valve 152. Specifically, during selected boosted purging conditions, the shallower intake manifold vacuum may be applied on canister 122 via a low (or ultra-low) restriction purge valve (LRPV) 168. Canister purge conduit 119 may be coupled to branched bypass purge conduit 188 at a location upstream of intake manifold 144 and downstream of pressure restriction valve 168.

Low restriction purge valve (LRPV) 168 may be configured as a mechanical valve including a spring-loaded ball valve 169, the valve configured to open at shallow manifold vacuum levels and close (e.g., sharply or progressively) at higher manifold vacuum levels (wherein CPV 164 becomes the purge rate controlling device and canister purge conduit 119 becomes the purge flow route). LRPV 168 further includes a flow restriction, herein sonic choke 170, serially coupled upstream of the spring-loaded ball of valve 169. It will be noted that spring-loaded ball valve 169 and sonic choke 170 may be positioned within a single, common housing of LRPV 168. It will be appreciated that LRPV may include mechanical valves other than spring-loaded ball valves and flow restrictions other than sonic chokes without departing from the scope of the present disclosure. A maximum purge flow rate through LRPV 168 is limited by a size or diameter of an orifice of sonic choke 170. In the present example, sonic choke 170 of LRPV 168 is far less restrictive than sonic choke 174 of CPV 164. Consequently, for a given pressure difference, a highest purge flow rate is enabled through branched bypass purge conduit 188 as compared to branched purge conduit 184 or canister purge conduit 119. In one example, sonic choke 170 may be sized to provide substantially no flow resistance (e.g., in the 0-4 kPa pressure difference region). In some examples, a check valve may be included in branched bypass purge conduit 188 at a location downstream of LRPV 168 to reduce the possibility of reverse flow.

Thus, if bypass valve 166 is open and a high vacuum exists in intake manifold 144, the spring-loaded valve 169 shuts. If bypass valve 166 is open and a pressure exists in intake manifold 144, spring-loaded valve 169 shuts. If bypass valve 166 is open, spring-loaded valve 169 opens only for shallow vacuum in intake manifold 144. Regardless of bypass valve 166, spring-loaded valve 169 prevents reverse flow out of intake manifold 144 which is especially important during conditions when intake manifold 144 is pressurized.

FIGS. 2-3 show alternate embodiments of the engine system of FIG. 1. As such, components previously introduced are numbered similarly and not re-introduced. Embodiment 200 depicted at FIG. 2 represents a simpler implementation of the various purge routes. LRPV 168 is configured with only sonic choke 170 and without spring-loaded ball valve 169. And even this sonic choke provides a minimal restriction to the flow path from canister 122*m*, through bypass valve 166, then through branched bypass purge conduit 188, LRPV 170, and then through check valve 202 into intake manifold 144. As in FIG. 1, in embodiment 200, sonic choke 170 is sized to have a much lower restriction (and therefore a higher purge flow at a given pressure difference) than the low restriction of CPBV 166. In addition, a check valve 202 is included in branched bypass purge conduit 188, downstream of sonic choke 170/LRPV 168, and upstream of a location where canister purge conduit 119 merges with branched bypass purge conduit 188. As such, this configuration requires bypass valve 166 to be turned off in high intake manifold vacuum situations, which requires active valve control. A failed open valve may be an undesirable failure mode. In comparison, FIG. 1 has two valves that would have to fail before the failure mode (of too much air flow into the intake manifold) became severe.

Another advantage provided by the embodiment of FIG. 2 is that a controller could open both the deep vacuum and shallow vacuum paths at 25 kPa of vacuum. Consequently, the controller is not restricted in going from deep vacuum mode to shallow vacuum mode exclusively. Instead, the deep vacuum mode of purging (via CPV and the canister purge conduit into the intake manifold) and the shallow vacuum mode of purging (via the LRPV and the branched bypass purge conduit into the intake manifold) may occur concurrently.

Embodiment 300 depicted at FIG. 3 represents another implementation of the various purge routes which eliminates the expense of a PCM-controlled bypass valve (that is, CPBV 166) in the boost and shallow vacuum flow paths. Herein, LRPV 168 includes spring-loaded ball valve 302 (which is the spring loaded valve 169 of the embodiments of FIGS. 1-2) positioned in bypass conduit 184, and sonic choke 170 positioned in branched bypass purge conduit 188. Spring-loaded ball valve 302 is configured to close during high vacuum conditions. As in FIGS. 1-2, in embodiment 300, sonic choke 170 is sized to have a lower restriction (and therefore a higher purge flow at the same pressure difference) than the low restriction of spring-loaded ball valve 302. In addition, check valve 202 is included in branched bypass purge conduit 188, downstream of sonic choke 170, and upstream of a location where canister purge conduit 119 merges with branched bypass purge conduit 188. One disadvantage of this embodiment is that it does not have absolute shut-off control over the boost and shallow vacuum flow paths. However, it can reduce flow through those paths dramatically by shutting VBV 124 and CVV 120, should it become desirable to do so.

Returning to FIG. 1, fuel system 40 may be operated by controller 112 in a plurality of modes by selective adjustment of the various valves and solenoids. For example, the fuel system may be operated in a fuel vapor storage mode wherein controller 112 may close CPV 164 and open canister vent valve 120 and VBV 124 to direct refueling and diurnal vapors into canister 122 while preventing fuel vapors from being directed into the intake manifold. In this mode, air stripped of fuel vapors may be streamed from canister 122 to the atmosphere through canister vent valve 120 and vent 117.

As another example, the fuel system may be operated in a refueling mode (e.g., when fuel tank refueling is requested by a vehicle operator), wherein the controller 112 may adjust the valves to equalize the pressure between the fuel tank and atmosphere 124 before enabling fuel to be added to the fuel tank.

As yet another example, the fuel system may be operated in one of a plurality of canister purging modes (e.g., when the canister is saturated, an emission control device has attained light-off temperature, and with the engine running). The controller may select between the different purging modes based on a manifold pressure (or manifold vacuum) estimate. For example, a first purging mode may be selected during engine operation with natural aspiration, when there is a deep intake manifold vacuum. Therein the controller 112 may command CPV 164 and CVV 120 open, while commanding VBV 124, CPBV 164, and SOV 185 (when included) closed. As such, during these conditions LRPV 168 may be automatically (or inherently) closed. During this mode, the deeper vacuum generated by the intake manifold may be used to draw fresh air through vent 117 and through fuel system canister 122 to purge the stored fuel vapors more restrictively into intake manifold 144.

As another example, a second purging mode may be selected during engine operation with higher levels of boost, when there no intake manifold vacuum. Therein the controller 112 may command SOV 185, CPBV 166, and CVV 120 open, while commanding CPV 164, and VBV 124, closed. As such, during these conditions LRPV 168 may be automatically (or inherently) closed. During this mode, compressor bypass flow through ejector 180 generates a vacuum at the suction port 194 of ejector 180. The ejector vacuum may be used to draw fresh air through vent 117 and through fuel system canister 122 to purge the stored fuel vapors into compressor inlet 145. As the motive flow passes through ejector 180, a mixture of the motive flow through the ejector and the purge flow drawn in via the suction port of the ejector, herein also referred to as mixed flow, is received at compressor inlet 145.

As another example, a third purging mode may be selected during engine operation with lower levels of boost, when there a shallow intake manifold vacuum (such as when the vehicle is cruising). Therein the controller 112 may command CPBV 166, and CVV 120 open, while commanding SOV 185, CPV 164, and VBV 124, closed. As such, during these conditions LRPV 168 may be automatically (or inherently) open. During this mode, the shallower vacuum generated by the intake manifold may be used to draw fresh air through vent 117 and through fuel system canister 122 to purge the stored fuel vapors less restrictively into intake manifold 144. In each of the purging modes, the purged fuel vapors from the canister, along with air drawn from the atmosphere to enable purging, are combusted in the engine. Based on the canister load, and further based on engine operating conditions, such as engine speed-load conditions, and a manifold pressure, a purge flow rate for a given purging mode may be determined. The purging in a given mode may be continued until the stored fuel vapors amount in the canister is below a threshold, or until a change in manifold pressure conditions require an exit from the given purging mode (and/or transition to an alternate purging mode). During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister. Additionally, or alternatively, one or more sensors, coupled to the canister 122, such as pressure sensor 138, may be used to provide an estimate of a canister load (that is, an amount of fuel vapors stored in the canister). In still other examples, the fuel system canister load may be based on the number and duration of refueling events that have occurred following a previous canister purging event, or based on a duration or distance of vehicle travel since a last purging event.

While the canister has a high fuel loading, the controller needs to be careful to avoid over-fueling the engine. However, when the canister has a low fuel loading, the air flow rate through the canister is generally maximized. When the engine air flow rate is high, it is rare that one would ever encounter so full a canister that the air flow rate though the canister would need to be limited.

Controller 112 may be configured as a microcomputer including a microprocessor unit, input/output ports, an electronic storage medium for executable programs and calibration values, random access memory, keep alive memory, and a data bus. Controller 112 may receive various signals from sensors 116 coupled to engine 102 such as BP sensor 196, MAP sensor 162, CIP sensor 160, TIP sensor 161, canister pressure sensor 138, etc. Furthermore, controller 112 may monitor and adjust the position of various actuators 118 based on input received from the various sensors 116. These actuators may include, for example, intake throttle 165, intake and exhaust valve systems, fuel injector 66, solenoid valve 172 of CPV 164, canister vent valve 120, VBV 124, SOV 185, and CPBV 166. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 4A-4B.

In this way, the engine system of FIGS. 1-3 enable a method of operating an engine comprising: during a first condition, purging a canister via a purge valve, during a second condition, purging the canister via an ejector coupled in a compressor bypass (or ejector passage); and during a third condition, purging the canister via a low restriction valve while bypassing each of the purge valve and the ejector. Herein, during the first condition, manifold vacuum is higher than an upper threshold, wherein during the second condition, manifold vacuum is lower than a lower threshold, and wherein during the third condition, the compressor is producing a minimum boost level (and further the manifold vacuum is between the upper and lower thresholds). In this way, canister purging may be enabled over a wider range of engine intake manifold pressure conditions.

Figure 4A:
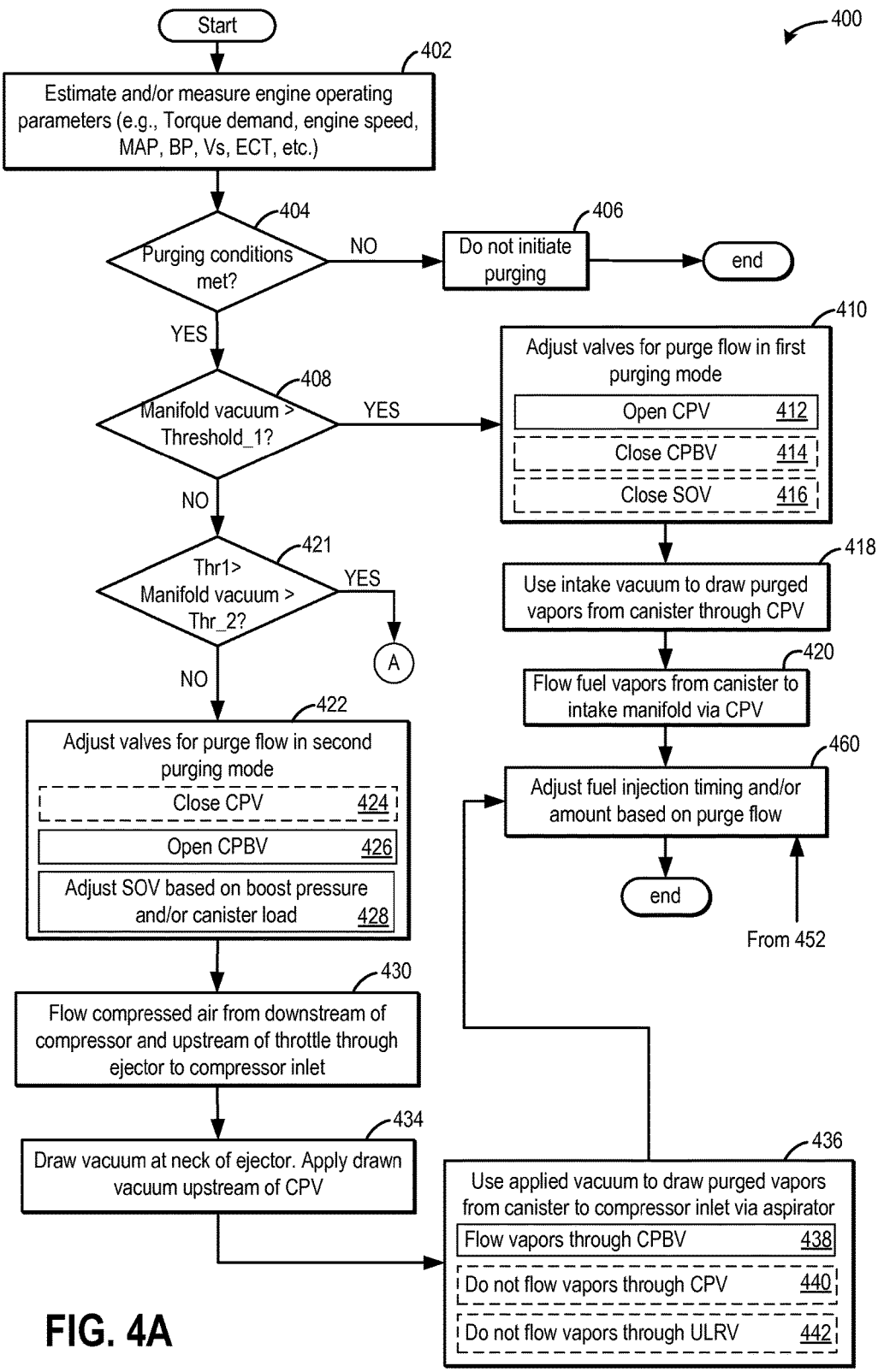
FIGS. 4A-4B depict a high level flowchart illustrating different purge modes that may be selected during boosted and non-boosted engine operation based on manifold pressure levels.
Figure 4B:
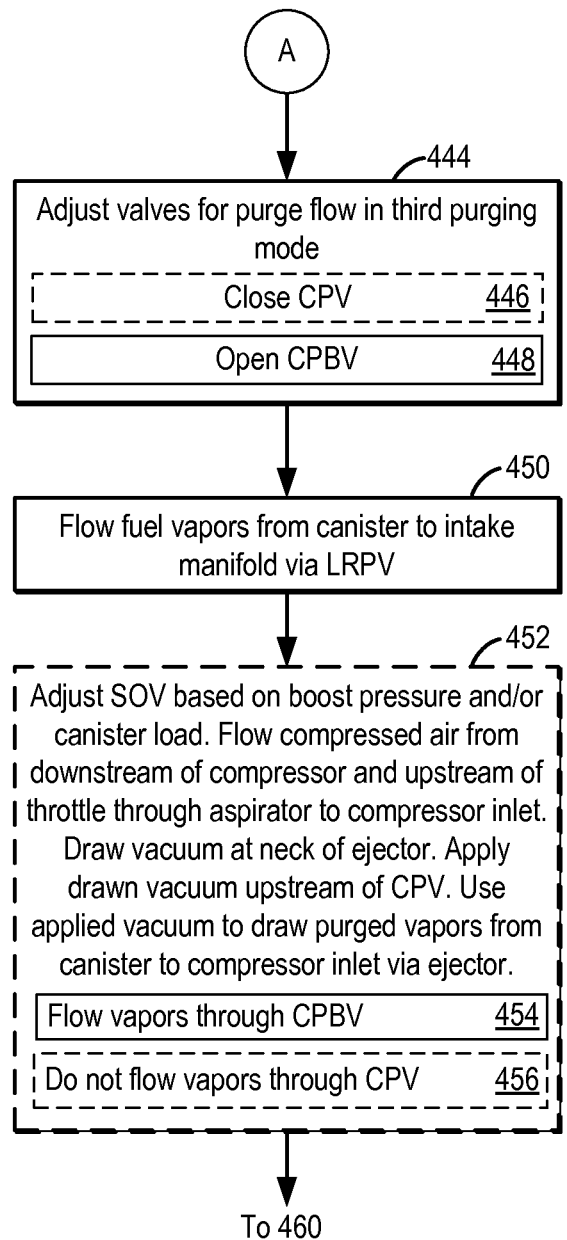

Turning now to FIGS. 4A-4B, an example routine 400 for selecting a canister purging mode and performing a canister purging operation based on manifold pressure of an engine system is depicted. Instructions for carrying out method 400 of FIGS. 4A-4B and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

At 402, engine operating parameters may be estimated and/or measured. The estimated parameters may include, for example, driver torque demand, vehicle speed, engine speed and load, ambient conditions (e.g., BP, ambient humidity, ambient temperature), MAP, MAF, air-fuel ratio, engine temperature, canister load, etc.

At 404, the method includes determining if fuel system canister purging conditions have been met. Purging conditions may be confirmed based on various engine and vehicle operating parameters, including an amount of hydrocarbons stored in the canister (canister load) being greater than a threshold load, the temperature of an exhaust emission catalyst being greater than a threshold temperature (such as a light-off temperature), a number of engine starts since a last purge operation being greater than a threshold, a threshold duration or distance of vehicle travel having been elapsed since a last purge operation, fuel properties such as fuel temperature, etc. If purging conditions are not confirmed, a purging routine is not initiated at 406, and routine 400 ends with the engine continuing nominal operation.

In alternative embodiments, a purging routine may be initiated by the controller based on existing engine conditions. For example, if the exhaust emission catalyst has achieved light-off, purging may be initiated even when canister load is less than the threshold load to further reduce stored hydrocarbon levels.

If purging conditions are met, at 408, it may be determined if intake manifold vacuum levels are greater than a first upper threshold (Threshold_1). Specifically, it may be determined if there is a deep engine intake manifold vacuum. Alternatively, it may be determined if the intake manifold pressure (MAP) is lower than a first upper threshold pressure. For example, it may be confirmed if MAP is less than BP−15 kPa. In one example, deep intake manifold vacuum conditions may be confirmed when the engine is operating with natural aspiration (and no boost) and above a threshold engine speed level.

If deep intake manifold vacuum conditions are confirmed, the method proceeds to 410 to adjust the positions of various valves for enabling purge flow in a first purging mode. Operating in the first purging mode includes opening a canister purge valve (e.g., CPV 164 of FIG. 1) at 412, while holding closed a canister purge bypass valve (e.g., CPBV 166 of FIG. 1) coupled in a bypass purge conduit (at 414) and holding closed an ejector shut-off valve (e.g., SOV 185 of FIG. 1) coupled upstream of a motive inlet of an ejector, the ejector coupled in a compressor bypass (or ejector passage) (at 416). Additionally, a canister vent valve (e.g., CVV 120 of FIG. 1) may be commanded open (from a closed position), and a vapor blocking valve (if present, such as VBV 124 of FIG. 1) may be commanded closed. As such, during deep intake manifold vacuum conditions, the mechanical low restriction purge valve may be (inherently) closed. Thus, during this first condition (or first purging mode), the method includes purging a canister via a purge valve. Further, during the first condition, fuel vapors from the canister do not flow through either an ejector in a compressor bypass (or ejector passage), a canister purge bypass valve in a bypass purge conduit, or a low restriction purge valve in a branched bypass purge conduit.

As such, commanding the CPV open includes commanding a pulse width modulated signal to a solenoid of the CPV to vary the duration of open valve time, thereby metering an average purge flow rate. The purge flow rate from the canister to the intake manifold via the CPV may be adjusted based on the canister load, and engine operating conditions such as engine speed and load, and air-fuel ratio. For example, as the canister load increases, a purge flow rate may be increased by increasing an opening of the CPV or holding the CPV open for a longer duration. As another example, as the engine speed increases, the purge flow rate may be increased. Further, the opening and closing of the solenoid CPV valve may be synchronized with engine cylinder combustion events. As will be noted, the solenoid valve in the CPV may be visualized as a gaseous fuel injector which injects fuel vapors (from a canister) along with air (from atmosphere to enable purging) into the engine intake.

At 418, the routine includes applying intake manifold vacuum on the canister to draw purged fuel vapors from the canister into the engine intake via the CPV. At 420, the method includes receiving fuel vapors from the canister and via the CPV in the intake manifold. As such, flowing fuel vapors through the CPV includes flowing the purged vapors through a solenoid valve of the CPV, and then flowing the purged vapors through the sonic choke of the CPV.

Next, at 460, the method includes adjusting engine fueling by fuel injectors based on the received purge flow. For example, a fuel injection timing and/or fuel injection amount may be modified based on the quantity of purged fuel vapors received from the canister in the intake manifold. In one example, the fuel injection amount and/or timing may be adjusted to maintain a cylinder air-fuel ratio at or close to a desired ratio, such as stoichiometry. For example, fueling via fuel injectors may be decreased as an amount of purged fuel vapors from the fuel vapor canister increases to maintain combustion at stoichiometry. In another example, fuel injection amount and/or timing may be modified to maintain engine combustion for torque. In yet another example, one or both of fuel injection timing and fuel injection amount may be varied to maintain each of engine torque and a stoichiometric air-fuel ratio. Furthermore, a sensor may determine an air-fuel ratio of exhaust gases exiting the engine and the determined air-fuel ratio may be compared with a desired air-fuel ratio. The controller may calculate an error based on a difference between the desired air-fuel ratio and the determined air-fuel ratio. Fuel injection from fuel injectors may, accordingly, be adjusted based on the calculated error.

Returning to 408, if deep engine intake manifold vacuum conditions are not confirmed, at 421, it may be determined if intake manifold vacuum levels are between the first upper threshold (Threshold_1) and a second lower threshold (Threshold_2). Specifically, it may be determined if there is a shallow engine intake manifold vacuum. Alternatively, it may be determined if the intake manifold pressure (MAP) is lower than a first, upper threshold pressure and above a second, lower threshold pressure. For example, it may be confirmed if BP<MAP<BP−10 kPa. In one example, shallow intake manifold vacuum conditions may be confirmed when the engine is operating with lower levels of boost, such as while cruising. The controller may be configured to operate the shallow vacuum purge path and deep vacuum purge path concurrently. However, the flow through the shallow vacuum path would dominate and as such the value of having both open may not be of substantial value.

If shallow intake manifold vacuum conditions are not confirmed, it may be determined that the engine is operating with higher levels of boost (e.g., while TIP is higher than CIP). Accordingly, at 422, the method includes adjusting the positions of various valves for enabling purge flow in a second purging mode. As such, the second purging mode is for a boosted engine operation. Operating in the second purging mode includes holding the canister purge valve closed at 424, while opening the canister purge bypass valve at 426, and while opening the ejector shut-off valve at 428. Specifically, at 428, an opening of the SOV may be adjusted based on boost pressure and/or canister load. For example, the opening of the SOV may be increased as the canister load increases to provide sufficient ejector vacuum for purging the canister. As another example, the opening of the SOV may be increased as the boost pressure increases. Additionally, the canister vent valve may be commanded open and the vapor blocking valve may be commanded closed. As such, during high boost (high MAP) conditions, the mechanical low restriction purge valve may be (inherently) closed.

At 430, the method includes circulating an amount of compressed air from the compressor outlet to the compressor inlet through the ejector in the compressor bypass (herein also referred to as the ejector passage), thereby generating vacuum at the neck of the ejector. At 434, the method includes drawing a vacuum at the neck of the ejector and applying the drawn ejector vacuum on the canister.

At 436, the method includes using the applied ejector vacuum to draw purged vapors from the canister to the compressor inlet via the ejector. Specifically, during this second condition (or second purging mode), the method includes purging the canister via an ejector coupled in a compressor bypass. Further, during the second condition, fuel vapors from the canister flow from upstream of the canister purge valve to the ejector via the canister purge bypass valve (at 438), and do not flow through either the purge valve in the purge conduit (at 440), or the low restriction purge valve in the branched bypass purge conduit (at 442).

From 436, the method proceeds to 460, wherein engine fueling (including fuel injection amount and timing) is adjusted by fuel injectors based on the received purge flow, as discussed above.

Returning to 420, if shallow intake manifold vacuum conditions are confirmed, at 444, the method includes adjusting the positions of the various valves for enabling purge flow in a third purging mode. As such, the third purging mode is for boosted or un-boosted engine operation with shallow manifold vacuum levels. Further, it may be possible to have some light boost while the intake manifold vacuum is shallow. In this case, the controller may allow multiple purge paths to be operated concurrently. Operating in the third purging mode includes holding the canister purge valve closed at 446, and the ejector shut-off valve closed, while opening the canister purge bypass valve at 448. Additionally, the canister vent valve may be commanded open and the vapor blocking valve may be commanded closed. As such, during shallow intake manifold vacuum conditions, the mechanical low restriction purge valve may be (inherently) open.

At 450, the method includes applying the shallow intake manifold vacuum on the canister and flowing fuel vapors from the canister to the intake manifold via the canister purge bypass valve and then the low restriction purge valve (LRPV). As such, flowing fuel vapors through the LRPV includes flowing the purged vapors through a sonic choke of the LRPV, and then through the spring-loaded ball valve of the LRPV. In one example, the low restriction purge valve is an ultra-low restriction purge valve. As discussed earlier, the bypass valve may be a binary valve adjustable between a fully open and a fully closed position, and further, a flow through the bypass valve may be more restrictive than flow through the low restriction purge valve. In other words, a purge flow rate through the low restriction purge valve during the third purging mode may be higher than a purge flow rate through the bypass valve during the second purging mode.

For example, with reference to the embodiment depicted at FIG. 2, various pressure drops may occur in the paths. For example, a pressure drop is experienced when air flow from vent 117 via vent valve 120 into canister 122, then when air and fuel vapors flow through bypass valve 166 into branched purge conduit 188 and into sonic choke 170, and then when flow is via check valve 202 into intake manifold 144. However, the controller may aim to get all the unnecessary pressure drops out of the way. The only necessary pressure drop is the one at canister 122. If the flow is too high to be controllable via bypass valve 166, a restriction is added at sonic choke 170. In one example, there may be one vacuum-maker (e.g., the shallow manvac) and one vacuum-taker (e.g., the canister). In this way, during this third condition (or third purging mode), the method includes purging the canister via a low restriction purge valve while bypassing each of the canister purge valve and the ejector.

In some embodiments, during the shallow manifold conditions, the canister may be purged via the LRPV to the intake manifold, and also via the ejector to the compressor inlet. For example, optionally at 452, while operating in the third purging mode with the LRPV open and with fuel vapors flowing to the intake manifold, an opening of the SOV may be adjusted based on boost pressure and/or canister load. As a result, an amount of compressed air may be recirculated from the compressor outlet to the compressor inlet through the ejector in the compressor bypass, thereby generating vacuum at the neck of the ejector. The vacuum drawn at the neck of the ejector may then be applied on the canister. Herein, fuel vapors may flow from the canister to the intake manifold or compressor inlet via the bypass valve (at 454) and while circumventing the canister purge valve (at 456).

From 452, the method proceeds to 460, wherein engine fueling (including fuel injection amount and timing) is adjusted by fuel injectors based on the received purge flow, as discussed above. Routine 400 then ends.

It will be appreciated that while the method of FIGS. 4A-4B depicts the three purge paths and three purging modes operating exclusive to each other, it will be appreciated that in alternate examples, there may be conditions where the three purge paths operate concurrently, wherein the routine of FIGS. 4A-4B represents the dominant purge path for each purging mode when operate. For example, there may be light boost levels present during shallow manifold vacuum conditions. During such conditions, purging may occur via the ejector (through the bypass valve, the bypass purge conduit, and into the compressor inlet) as well as the mechanical valve (through the LRPV, the branched bypass purge conduit, and into the intake manifold). However, during such a condition, flow through the LRPV may dominate over the flow through the ejector.

In this way, vacuum is advantageously harnessed to produce a desired flow rate through the canister. The plumbing is arranged to take advantage of the available vacuum to attempt to achieve a target flow rate through the canister. Specifically, the controller selects a plumbing and control approach that is appropriate for deep intake manifold vacuum, shallow intake manifold vacuum, and ejector-sourced vacuum conditions. The use of a mechanical purge valve is a branched bypass conduit advantageously increases canister purge flow rate during shallow vacuum conditions.

Referring now to FIG. 5, map 500 illustrates how a purge flow rate can be improved at shallow manifold vacuum conditions by leveraging the low restriction of a mechanically-actuated purge valve coupled in a branched purge conduit. Map 500 depicts a flow rate (e.g., flow rate of purge vapors) through a low restriction pressure valve, such as valve 168 of FIG. 1 (also reproduced at FIG. 5) across the y-axis. A pressure difference across the valve (ΔP) is shown across the x-axis. ΔP corresponds to a pressure difference between an inlet and an outlet of LRPV 168.

At negative values of ΔP, that is when the engine is operating with boost and MAP>BP, the valve may exhibit a zero flow rate, as indicated by segment 506. In other words, during boosted conditions, the spring-loading of the valve is not overcome, and the ball of the valve remains juxtaposed against the inlet of the valve, disallowing any flow through the valve. Effectively it functions like a check valve, preventing reverse flow direction. One might achieve this same behavior with a distinct check valve in series with the remaining features of the device.

As ΔP starts to increase, and engine operation moves into a shallow manifold vacuum (ManVac) region (such as where BP<MAP<BP−10 kPa), the spring-loading of the valve is gradually overcome, and the ball of the valve moves from away the inlet of the valve towards the outlet of the valve, gradually allowing flow through the valve. In other words, there is a gradual increase in valve opening with increase in manifold vacuum, as indicated by segment 502. By providing a low restriction across this valve, for a given ΔP, a larger purge flow is enabled through the LRPV as compared to a purge flow that would have been possible through a canister purge valve or a canister purge bypass valve of the engine system. A maximum purge flow rate attained through the valve may be dependent of a size of the restriction in the LRPV, the maximum purge flow rate attained increasing as the size of the restriction increases. In one example, this is attained through the use of a sonic choke coupled upstream of the spring-loaded valve, the sonic choke sized to offer substantially no resistance in the 0-4 kPa region of ΔP.

When ΔP starts increases above a limit (herein limit 504), and engine operation moves into a deep manifold vacuum (ManVac) region (such as where MAP<BP−15 kPa), the valve closes sharply and the valve resumes a zero flow rate, as indicated by segment 506. In alternate examples, the closing of the valve may be progressive instead of sharp and abrupt.

In this way, the low restriction purge valve allows for purge flow there-through at lower or shallower manifold vacuum conditions, and disables flow there-through at higher or deeper manifold vacuum conditions.

Referring now to FIG. 6, it presents map 600 illustrating various purge flow regions in the engine system of FIGS. 1-3, and a comparison between purge flow rates through the various purge valves and purge conduits of the engine system. Map 600 depicts a purge flow rate into an engine intake manifold (directly or via a compressor inlet) across the y-axis. Manifold vacuum is shown across the y-axis, the manifold vacuum level increasing to the right, the manifold vacuum level decreasing (that is, manifold pressure level increasing) to the left. Dashed line 610 represents a fuel vapor purge flow rate tolerance of the engine at the various engine operating conditions. The tolerance decreases as the engine manifold vacuum level increases.

A first purge flow rate in the boosted engine operation region is shown at segment 602. Specifically, segment 602 represents a maximum flow rate possible through a compressor bypass ejector at a given boost pressure. As shown, the maximum flow rate through the ejector increases as the boost pressure increases (e.g., as MAP exceeds BP), thereby increasing an amount of ejector vacuum generated and applied on a fuel vapor canister, and in turn increasing a maximum purge flow rate through the ejector. While the purge flow rate tolerance of the engine is higher at boosted conditions (compare segment 602 to line 610), the maximum purge flow rate during the boosted conditions is limited based on a size of the ejector's restriction (that is, the narrowing at the throat of the ejector). It will be appreciated that since the ejector is coupled to the canister at a location upstream of the canister purge valve, and via a less restrictive bypass valve, the purge flow is able to circumvent the more restrictive canister purge valve, allowing for higher purge flow rates through the ejector.

A second purge flow rate in the naturally aspirated engine operation region with deep intake manifold vacuum is shown at segment 604. Specifically, segment 604 represents a maximum flow rate possible through a canister purge valve at a given manifold pressure. As shown, the maximum flow rate through the canister purge increases as the amount of manifold vacuum available increases (e.g., as MAP falls below BP), thereby increasing an amount of intake manifold vacuum applied on a fuel vapor canister, and in turn increasing a maximum purge flow rate through the canister purge valve. The purge flow tolerance of the engine is lower at higher manifold vacuum conditions (compare segment 604 to line 610). In addition, during the deeper manifold vacuum conditions, the maximum purge flow rate through the canister purge valve is limited based on a size of the canister purge valve's sonic choke.

A third purge flow rate in the shallow intake manifold vacuum region is shown at segment 606. Specifically, segment 604 represents a maximum flow rate possible through a canister purge bypass valve at a given manifold pressure. As shown, the maximum flow rate through the bypass valve increases rapidly at shallow manifold vacuum conditions. Serendipitously, the purge flow tolerance of the engine is higher in this region as compared to at higher manifold vacuum conditions (compare segment 606 to line 610), at least due to the higher airflow to the engine during such conditions. In addition, during the shallow manifold vacuum conditions, the maximum purge flow rate through the bypass valve is significantly higher than the maximum flow rate through the canister purge valve. As a result, a region of enhanced purge flow rate 608 is provided wherein substantial purge flow can be produced despite the lower manifold vacuum level. If the shallow vacuum path were allowed to be open for MAP>CIP, undesired reverse flow may occur. If the shallow vacuum path were allowed to be open for deep vacuum, canister purge flow would be undesirably high. The region 608 represents the added canister flow rate made possible by the adding of the novel shallow vacuum path.

In this way, purge flow is enhanced in the shallow intake manifold vacuum region through the use of a less restrictive purge path that bypasses the more restrictive canister purge valve.

Figure 7:
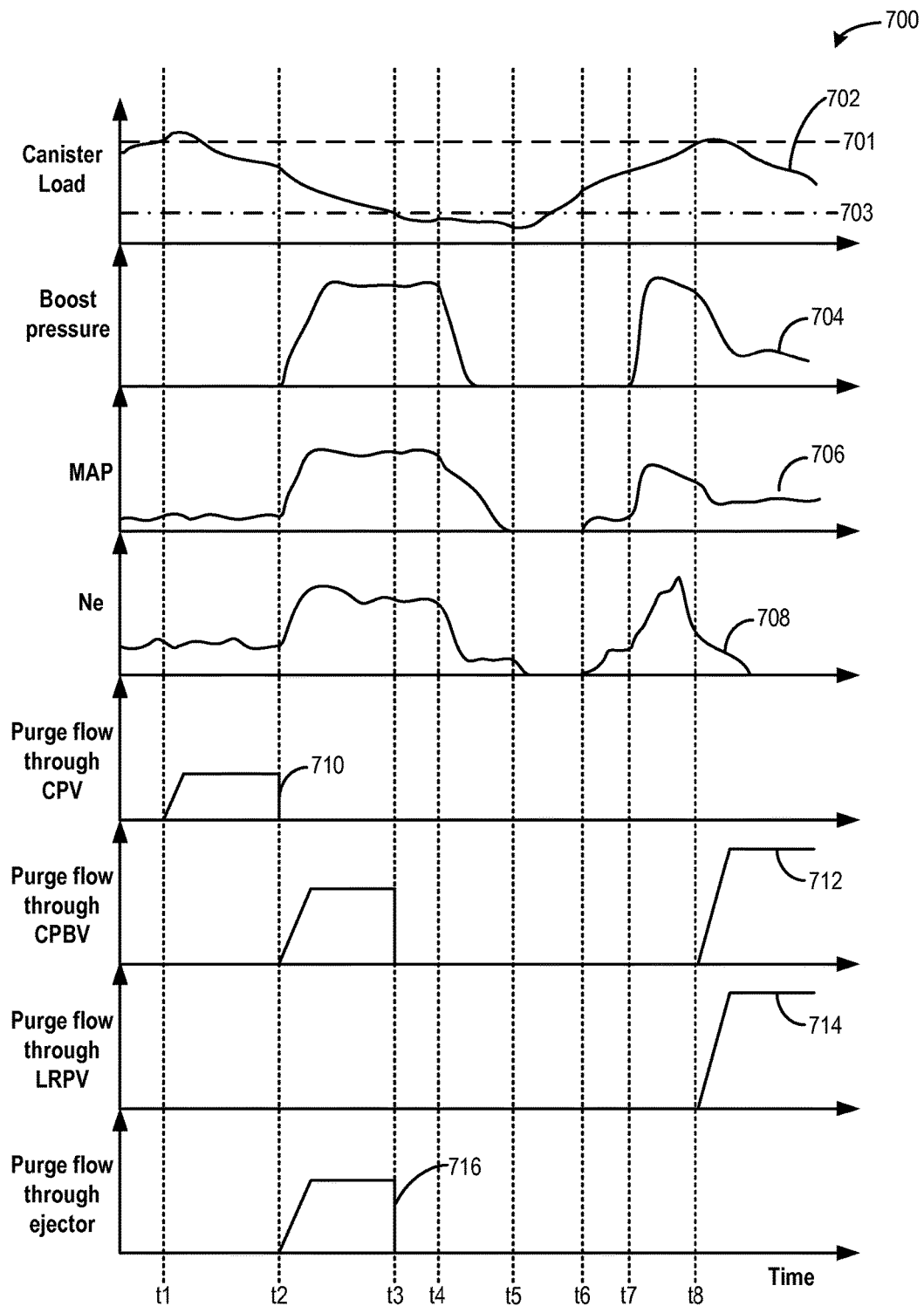
FIG. 7 depicts example purging operations according to the present disclosure.

Turning now to FIG. 7, map 700 depicts example purging operations at different engine operating conditions and via different purge routes and vacuum sources. Map 700 depicts canister load at plot 702, boost pressure at plot 704, manifold pressure (MAP) at plot 706, engine speed (Ne) at plot 708, purge flow through a canister purge valve (CPV) at plot 710, purge flow through a canister purge bypass valve (CPBV) at plot 712, purge flow through a low restriction purge (LRPV) at plot 714, and purge flow through a compressor bypass ejector at plot 716. All plots are depicted over time, along the x-axis.

Prior to t1, the engine may be operating with natural aspiration and no boost. As a result, the manifold pressure may be low. Also prior to t1, the canister load may be below an upper threshold 701. During such a time, diurnal fuel vapors may be stored in the canister with a resultant gradual increase in canister load.

At t1, in response to the canister load reaching or exceeding upper threshold 701, canister purging may be triggered. Due to the engine operating at low MAP, a first purge mode with canister purging using intake manifold vacuum may be selected. Therein, a canister purge valve coupled between the intake manifold and the canister may be opened allowing for increased purge flow through the CPV to the intake manifold. A maximum flow rate through the CPV may be limited by a sonic choke of the CPV. The CPV may be held open for a duration from t1 to t2 during which time the canister load may gradually decrease.

As such, a purge flow rate through the CPV is smaller. This is because when the engine is using very little fuel (at lower engine speeds) and the fuel-air mixture out of the canister is mostly fuel vapor (associated with a nearly fully loaded canister), the deep intake manifold path is used to purge the canister. However, the deep intake manifold vacuum path only sips from the canister (at a lower purge flow rate) in order not to overdose on fuel vapor. Once the engine fuel rate is higher, it can gulp from the canister (at a higher purge flow rate). And once the effluent form the canister is mostly air (associated with a nearly empty canister), then the objective becomes simply to get as much air through that canister as possible.

At t2, in response to an increase in driver torque demand (such as due to an operator pedal tip-in), boost may be enabled. As a result, boost pressure may rise, MAP may rise (above barometric pressure), and engine speed may rise. In response to boost being enabled while the canister load is still not sufficiently purged, at t2, the engine may be transitioned from the first purging mode to a second purging mode. The second purging mode may include canister purging using ejector vacuum from a compressor bypass ejector. Therein, an ejector shut-off valve is opened to recirculate compressed air across a compressor bypass, via an ejector, while drawing a vacuum at the ejector. In addition, a canister purge bypass valve in a bypass purge conduit circumventing the CPV is also opened. The ejector vacuum is then applied on the canister and canister fuel vapors are drawn into the compressor inlet via the CPBV. As a result, there may be increased purge flow through the CPBV to the compressor inlet, and via the ejector, and from there the fuel vapors may be delivered to the intake manifold. At the same time, the canister purge valve may be closed stopping purge flow through the CPV. A maximum flow rate through the CPBV and ejector may be limited by a size of the CPBV and the ejector's flow restriction.

The CPBV and SOV (not shown) may be held open for a duration from t2 to t3 during which time the canister load may gradually decrease. The purge flow rate through the aspirator may be higher than the purge flow rate applied through the CPV at t1-t2. At t3, in response to the canister load reaching or falling below a lower threshold 703, purging may be discontinued. However, between t3 and t4, the engine may continue to be operated with boost. At t4, in response to a drop in torque demand, boost may be disabled and the engine may resume operation with natural aspiration.

At t5, the engine may be shut-down for a refueling event. During the refueling event, refueling vapors may be trapped in the fuel vapor canister, resulting in a rise in canister load. At t6, engine operation with natural aspiration may be resumed. At t7, in response to an increase in driver torque demand (such as due to another operator pedal tip-in), boost may be re-enabled. As a result, boost pressure may rise, MAP may rise (above barometric pressure), and engine speed may rise. From t6 to t8, diurnal fuel vapors generated during engine operation (un-boosted between t6 and t7, and boosted between t7 and t8) may be trapped in the fuel vapor canister with a corresponding further rise in canister load.

Shortly before t8, boost pressure may be reduced, due to a drop in driver torque demand. As a result, engine speed and MAP may drop, and intake manifold vacuum levels may become shallow. At t8, in response to the canister load reaching or exceeding upper threshold 701, canister purging may be re-triggered. Due to the engine operating at mid-MAP and low manifold vacuum levels, a third purge mode with canister purging using intake manifold vacuum may be selected. Herein, canister purging using the shallow manifold vacuum is enhanced using a low restriction purge valve that circumvents the more restrictive purge path through the CPV. Specifically, the canister purge bypass valve is actuated open, while a low restriction mechanical purge valve in a branched bypass purge conduit circumventing the CPV and the ejector is forced open. The shallow intake manifold is then applied on the canister and canister fuel vapors are drawn into the intake manifold via the CPBV and the LRPV. As a result, there may be increased purge flow through the CPBV. At the same time, the canister purge valve is closed stopping purge flow through the CPV to the intake manifold, and the ejector SOV is closed stopping purge flow through the ejector. A maximum flow rate through the LRPV may be limited by a sonic choke of the LRPV. The LRPV may be held open for a duration during which time the canister load may gradually decrease. Herein, by applying the intake manifold vacuum through a less restrictive purge valve, higher purge flow rates are enabled even while using shallow manifold vacuum. The purge flow rate through the LRPV may be higher than the purge flow rate applied through either the CPV at t1-t2 or the aspirator at t2-t3.

In still other examples, the canister may be purged via each of the ejector and the LRPV during the shallow manifold vacuum conditions. For example, a method for an engine may comprise: during boosted conditions, purging a first amount of fuel vapors from a canister to an intake manifold via a lower restriction valve; purging a second amount of fuel vapors from the canister to a compressor inlet via an ejector and a higher restriction valve; and adjusting a ratio of the first amount to the second amount based on boost pressure. The adjusting may include, as the boost pressure decreases, increasing the first amount while correspondingly decreasing the second amount. In the above example, while purging each of the first amount and the second amount, the low restriction valve may be commanded open and a canister purge valve coupled between the canister and the intake manifold is commanded closed. In such an example, purging the first amount includes flowing fuel vapors from upstream of the canister purge valve, then through the higher restriction valve, and then through the lower restriction valve into the intake manifold, and wherein purging the second amount includes recirculating compressed air from a compressor inlet to a compressor outlet through the ejector, and flowing fuel vapors from upstream of the canister purge valve, then through the higher restriction valve, and then through the ejector into the compressor inlet. In the above embodiments, the lower restriction valve is a mechanical valve actuated via the boost pressure while the higher restriction valve is a solenoid actuated valve. Any of the above method embodiments may further comprise, during naturally aspirated conditions, purging fuel vapors from the canister to the intake manifold via the canister purge valve while bypassing each of the lower and the higher restriction valve, the fuel vapors purged into the intake manifold at a location downstream of the lower restriction valve.

In another example, an engine system comprises: an engine including an intake manifold; a pressure sensor for estimating an intake manifold pressure; a compressor coupled to the intake for providing a boosted aircharge to the engine; a charge air cooler for cooling the boosted aircharge; a compressor bypass for recirculating boosted aircharge from downstream of the charge air cooler to a compressor inlet; and an ejector coupled in the compressor bypass. The engine system further includes a fuel system including a fuel tank coupled to a canister; a first purge line coupling the canister to the intake manifold via a canister purge valve; a second bypass purge line coupling a suction port of the ejector to the first purge line upstream of the canister purge valve, the second bypass purge line including a first bypass valve; a third bypass purge line coupling the second bypass purge line, downstream of the first bypass valve and upstream of the ejector, to the engine intake manifold via a second bypass valve, the first purge line coupled to the third purge line downstream of the second bypass valve; and a controller. The controller may be configured with computer readable instructions stored on non-transitory memory for: operating in a first purging mode to purge fuel vapors from the canister to the intake manifold via the first purge line; operating in a second purging mode to purge fuel vapors from the canister to the compressor via the second bypass purge line; operating in a third purging mode to purge fuel vapors from the canister to the intake manifold via the third bypass purge line; and selecting between the first, second, and third purging modes based on the estimated manifold pressure. In the above system, the selecting includes selecting the first purging mode when the estimated manifold pressure is below a lower threshold, selecting the second purging mode when the estimated manifold pressure is above an upper threshold, and selecting the third purging mode when the estimated manifold pressure is above the lower threshold and below the upper threshold. Also in the above system, operating in the first purging mode includes commanding each of the canister purge valve open and a shut-off valve coupled upstream of the ejector in the compressor bypass open while commanding the first bypass valve closed. Also in the above embodiment, operating in the second purging mode includes commanding each of the first bypass valve and the shut-off valve open while commanding the canister purge valve closed. Further, operating in the third purging mode includes commanding each of the canister purge valve and the shut-off valve closed, while commanding the first bypass valve open. In the above embodiments, commanding the first bypass valve open includes fully opening the first bypass valve. In any of the above embodiments, during the first purging mode, an opening of the canister purge valve is based on a canister load, during the second purging mode, an opening of the shut-off valve is based on the canister load, and during the third purging mode, a purge flow rate through the second bypass valve is based on manifold pressure.

In a further representation, a method for a boosted engine comprises: during a first boosted condition, flowing stored fuel vapors from a canister into a suction port of an ejector coupled in a compressor bypass passage, the stored fuel vapors flowing through a first bypass valve of a bypass passage, while circumventing a canister purge valve; and during a second boosted condition, flowing stored fuel vapors from the canister into an intake manifold, the stored fuel vapors flowing through the first bypass valve of the bypass passage and a second bypass valve of a bypass branch, while circumventing the canister purge valve and the ejector. In the above method, a boost level during the first boosted condition is higher than the boost level during the second boosted condition. Also in the above method, flowing through the first bypass valve includes electrically opening the first bypass valve by actuating a solenoid, while flowing through the second bypass valve includes mechanically opening the second bypass valve using boost pressure.

In this way, purge flow rates attainable during shallow manifold vacuum conditions can be significantly enhanced using a low restriction mechanical valve. By improving the purge flow rate at low-mid manifold pressure conditions, canister purging can be extended to shallow manifold vacuum conditions, and purging can be performed over a wider range of engine operating conditions. In addition, canister purging can be performed over a larger portion of an engine drive cycle, allowing for a more complete cleaning of the canister. By enabling a larger portion of canister purging to be performed during shallow manifold vacuum conditions, where air flow levels are higher, air-fuel excursions resulting from the ingestion of purge fuel vapors are reduced, improving engine performance and combustion stability during purging operations. By increasing purge vapor ingestion, engine fuel economy is improved, and exhaust emissions are reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during boosted conditions,
purging a first amount of fuel vapors from a canister to an intake manifold via a lower restriction valve;
concurrently purging a second amount of fuel vapors from the canister to a compressor inlet via an ejector and a higher restriction valve; and
adjusting a ratio of the first amount to the second amount based on boost pressure.

2. The method of claim 1, wherein the adjusting includes, as the boost pressure decreases, increasing the first amount while correspondingly decreasing the second amount.

3. The method of claim 1, wherein while purging each of the first amount and the second amount, the higher restriction valve is commanded open and a canister purge valve coupled between the canister and the intake manifold is commanded closed.

4. The method of claim 3, wherein purging the first amount includes flowing fuel vapors from upstream of the canister purge valve, then through the higher restriction valve, and then through the lower restriction valve into the intake manifold, and wherein purging the second amount includes recirculating compressed air from the compressor inlet to a compressor outlet through the ejector, and flowing fuel vapors from upstream of the canister purge valve, then through the higher restriction valve, and then through the ejector into the compressor inlet.

5. The method of claim 1, wherein the lower restriction valve is a mechanical valve actuated via the boost pressure and wherein the higher restriction valve is a solenoid actuated valve.

6. The method of claim 3, further comprising, during naturally aspirated conditions, purging fuel vapors from the canister to the intake manifold via the canister purge valve while bypassing each of the lower and the higher restriction valves, the fuel vapors purged into the intake manifold at a location downstream of the lower restriction valve.

7. A method for an engine, comprising:
during boosted conditions,
purging a first amount of fuel vapors from a canister to an intake manifold via a lower restriction valve;
concurrently purging a second amount of fuel vapors from the canister to a compressor inlet via an ejector and a higher restriction valve; and
adjusting a ratio of the first amount to the second amount based on boost pressure, wherein while purging each of the first amount and the second amount, the higher restriction valve is commanded open and a canister purge valve coupled between the canister and the intake manifold is commanded closed.

8. The method of claim 7, wherein purging the first amount includes flowing fuel vapors from upstream of the canister purge valve, then through the higher restriction valve, and then through the lower restriction valve into the intake manifold, and wherein purging the second amount includes recirculating compressed air from the compressor inlet to a compressor outlet through the ejector, and flowing fuel vapors from upstream of the canister purge valve, then through the higher restriction valve, and then through the ejector into the compressor inlet.

9. The method of claim 7, further comprising, during naturally aspirated conditions, purging fuel vapors from the canister to the intake manifold via the canister purge valve while bypassing each of the lower and the higher restriction valves, the fuel vapors purged into the intake manifold at a location downstream of the lower restriction valve.

* * * * *